(12) United States Patent
Rammert et al.

(10) Patent No.: US 12,037,000 B2
(45) Date of Patent: Jul. 16, 2024

(54) DEVICE AND METHOD FOR CARRYING OUT AT LEAST ONE VEHICLE FUNCTION FOR A VEHICLE

(71) Applicant: Knorr-Bremse Systeme Fuer Nutzfahrzeuge GmbH, Munich (DE)

(72) Inventors: Alexander Rammert, Kornwestheim (DE); Christian Kaufmann, Sindelfingen (DE); Thorsten Beyse, Dettingen (DE); Maximilian Pohlmann, Bruchsal (DE); Wolfgang Gscheidle, Oberstenfeld (DE); Felix Hoos, Moeglingen (DE); Dordo Stankovic, Asperg (DE); Matthias Roth, Vaihingen an der Enz (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 269 days.

(21) Appl. No.: 17/596,216

(22) PCT Filed: Jun. 4, 2020

(86) PCT No.: PCT/EP2020/065467
§ 371 (c)(1),
(2) Date: Dec. 6, 2021

(87) PCT Pub. No.: WO2020/254120
PCT Pub. Date: Dec. 24, 2020

(65) Prior Publication Data
US 2022/0306131 A1 Sep. 29, 2022

(30) Foreign Application Priority Data
Jun. 17, 2019 (DE) ..................... 10 2019 116 375.7

(51) Int. Cl.
*B60W 50/023* (2012.01)
*B60R 16/023* (2006.01)
(Continued)

(52) U.S. Cl.
CPC ....... *B60W 50/023* (2013.01); *B60R 16/0232* (2013.01); *B60W 10/184* (2013.01);
(Continued)

(58) Field of Classification Search
CPC ............. B60W 50/023; B60W 10/184; B60W 10/20; B60W 50/0205; B60W 2510/18;
(Continued)

(56) References Cited

U.S. PATENT DOCUMENTS 9,783,193 B2 * 10/2017 Lasson .................. B60W 20/50
11,072,319 B2 * 7/2021 Kearney ................. B60T 17/22
(Continued)

FOREIGN PATENT DOCUMENTS

CN 101772871 7/2010
CN 104057900 A 9/2014
(Continued)

OTHER PUBLICATIONS

International Search Report for PCT/EP2020/065467 Issued Sep. 16, 2020.

*Primary Examiner* — Yonel Beaulieu
*Assistant Examiner* — Jean W Charleston
(74) *Attorney, Agent, or Firm* — NORTON ROSE FULBRIGHT US LLP; Gerard A. Messina

(57) ABSTRACT

A device for carrying out at least one vehicle function, including: a first control unit having a first main unit and a first redundant unit, the first control unit being for controlling a first vehicle function; a second control unit having a second main unit and a second redundant unit, the second control unit being for controlling a second vehicle function;
(Continued)

and a first electrical system to connect the first main unit to the second redundant unit and a second electrical system separated from the first electrical system, which for connecting the second main unit to the first redundant unit, the second main unit being for controlling the first redundant unit if the first electrical system fails and/or the first main unit being for controlling the second redundant unit if the second electrical system fails. Also described are a related method, control apparatus, and computer readable medium.

9 Claims, 3 Drawing Sheets

(51) Int. Cl.
    *B60W 10/184*     (2012.01)
    *B60W 10/20*     (2006.01)
    *B60W 50/02*     (2012.01)
(52) U.S. Cl.
    CPC ........ *B60W 10/20* (2013.01); *B60W 50/0205* (2013.01); *B60W 2510/18* (2013.01); *B60W 2510/20* (2013.01)
(58) Field of Classification Search
    CPC ............. B60W 2510/20; B60R 16/023; B60R 16/033
    USPC .......................................................... 701/29
    See application file for complete search history.

(56) References Cited

U.S. PATENT DOCUMENTS

| | | | | |
|---|---|---|---|---|
| 2008/0136252 A1* | 6/2008 | Ro | ........................ | B60W 20/50 303/113.4 |
| 2015/0175103 A1* | 6/2015 | Yamazaki | .......... | G01R 31/3278 701/29.1 |
| 2017/0050635 A1* | 2/2017 | Kitahata | ........... | B60W 50/0205 |
| 2017/0349048 A1* | 12/2017 | Nakayama | ................ | B60L 3/04 |
| 2019/0001963 A1* | 1/2019 | Kim | ....................... | B60W 20/20 |
| 2020/0079354 A1* | 3/2020 | Damsaz | ............ | B60W 50/0097 |
| 2020/0164893 A1 | 5/2020 | Orlov et al. | | |
| 2021/0129831 A1* | 5/2021 | Hecker | ............... | B60W 10/184 |
| 2021/0188280 A1* | 6/2021 | Abe | ...................... | B60K 17/356 |

FOREIGN PATENT DOCUMENTS

| | | | | |
|---|---|---|---|---|
| CN | 104242382 A | 12/2014 | | |
| DE | 102006062300 A1 | 10/2008 | | |
| DE | 102007050730 A1 * | 4/2009 | ........... | B62D 5/0463 |
| DE | 102007050730 A1 | 4/2009 | | |
| DE | 102012021564 A1 * | 5/2014 | ........ | B60W 50/0098 |
| DE | 102012021564 A1 | 5/2014 | | |
| DE | 102015214521 A1 * | 2/2017 | .............. | B60T 17/18 |
| DE | 102015214521 A1 | 2/2017 | | |
| EP | 2587330 A2 | 5/2013 | | |

\* cited by examiner

DEVICE AND METHOD FOR CARRYING OUT AT LEAST ONE VEHICLE FUNCTION FOR A VEHICLE

FIELD OF THE INVENTION

The present approach relates to a device and a method for carrying out at least one vehicle function for a vehicle.

BACKGROUND INFORMATION

While in its early days an automobile only provided the basic functions of accelerating, steering and braking and demanded full attention from the driver, the requirements have constantly evolved in recent decades. Driven by the growing need for comfort and safety, functions such as lane keeping assist, lane changing assist, or emergency braking assist have found their way into modern motor vehicles. In the medium term, this can relieve the load on the driver, although he still retains responsibility for driving the vehicle and therefore has to intervene in the event of a fault and take control of the vehicle. He thus forms the fallback level for the electronic system. Against this background, with regard to highly automated vehicles, selected functions of the vehicle should be guaranteed by the electronics at least for a short time, even in the event of a fault, without personal injury being expected. Thus, the system now forms the fallback level and no longer the driver. This results in increased demands on the development of such systems, which are referred to as "fault-tolerant".

Against this background, the object of the present approach is to create an improved device for carrying out at least one vehicle function for a vehicle and an improved method for carrying out at least one vehicle function for a vehicle.

This object is achieved by a control device as described herein, by a method as described herein and by a computer program as described herein.

The advantages achievable with the presented approach are that both material costs and manufacturing costs can be saved, as fewer components and thus less space is required in the vehicle. Consequently, for example, the weight of the vehicle can be reduced and at the same time the safety of road users such as vehicle occupants, pedestrians, cyclists, or occupants of other vehicles can be ensured.

SUMMARY OF THE INVENTION

Against this background, a device for carrying out at least one vehicle function for a vehicle is presented. The device has a first control unit with a first main unit and a first redundant unit. The first control unit is configured to control a first vehicle function. Furthermore, the device has a second control unit with a second main unit and a second redundant unit. The second control unit is configured to control a second vehicle function. Furthermore, the device also has a first electrical system, which is configured to connect the first main unit to the second redundant unit. A second electrical system separate from the first electrical system is configured to connect the second main unit to the first redundant unit. The second main unit is configured to control the first redundant unit if the first electrical system fails and in addition or alternatively the first main unit is configured to control the second redundant unit if the second electrical system fails.

The device may be arranged, for example, in a vehicle which is configured to transport persons and additionally or alternatively objects. The device is configured to carry out a vehicle function, such as safety-relevant functions, but also comfort functions of the vehicle. A safety-relevant function may be, for example, a function which increases personal protection such as an airbag function or an emergency braking assist function. A comfort function may be, for example, a function which increases the comfort of an occupant, such as a seat heating function. The first control unit has the first main unit and the first redundant unit and is configured to control the first vehicle function. The first main unit and the first redundant unit, for example, are integrated into the first control unit. The first redundant unit is configured to take over the task of the first main unit in the event of a failure and to maintain the first vehicle function accordingly. The second control unit has the second main unit and the second redundant unit and is configured to control the second vehicle function. The second main unit and the second redundant unit, for example, are integrated into the second control unit. Advantageously, in this way, the space requirement of the device in the vehicle can be reduced. The second redundant unit is configured accordingly in order to take over the task of the second main unit as a "backup" in the event of a failure in order to maintain the second vehicle function. The first electrical system and the second electrical system can be independent of each other, so that in the event of a failure of the first electrical system, the second electrical system can advantageously continue to perform the vehicle functions, and in the event of a failure of the second electrical system the first electrical system can advantageously continue to perform the vehicle functions. For example, even in the event of a fault in the first main part (which has no influence on the first electrical system), the system can continue to maintain the function through the redundant part. Thus, the system described in this form is advantageous even if the electrical systems are not independent (or there is even only one electrical system).

According to one embodiment, the first main unit and the first redundant unit and additionally or alternatively the second main unit and the second redundant unit may be galvanically isolated from each other. Advantageously, interference between the first main unit and the first redundant unit of the first control unit and additionally or alternatively between the second main unit and the second redundant unit of the second control unit can be avoided.

According to one embodiment, the first electrical system may have a first energy source and the second electrical system may have a second energy source. The first energy source and additionally or alternatively a first actuator for carrying out the first vehicle function may be arranged within a first maximum distance of the first main unit and the first redundant unit. Furthermore, the second energy source and additionally or alternatively a second actuator for carrying out the second vehicle function may be arranged within a second maximum distance of the second main unit and the second redundant unit. The energy sources can be realized, for example, as batteries, which may be configured to supply the first energy source or the second energy source with power, so that advantageously the first vehicle function or the second vehicle function can be carried out. The first actuator may, for example, be in the form of a steering actuator and/or an actuator for lateral guidance, which is configured to influence lane guidance of the vehicle. The second actuator may be realized, for example, as an actuator for longitudinal guidance and/or as a brake control system, so that the vehicle can advantageously change a speed of the vehicle, especially reduce it. In the future, the "braking" functionality could also be implemented in the area of the power train (electric motor). The maximum distance of the first and additionally or alternatively of the second energy source from the respective actuators or from the control units can be one meter, for example. Advantageously, voltage drops, for example within the connection, can be reduced by the maximum distance.

The first electrical system may be configured to feed the first main unit and the second redundant unit with energy. The second electrical system may be configured accordingly to feed the second main unit and the first redundant unit with energy. Advantageously, in the event of a malfunction or failure, the other electrical system can maintain the power supply, so that both the first vehicle function and the second vehicle function can still be maintained.

According to one embodiment, the first control unit and additionally or alternatively the second control unit may be configured to deactivate at least one comfort function of the vehicle if the first vehicle function and additionally or alternatively the second vehicle function fails. Advantageously, the safety of vehicle occupants can continue to be ensured, since, for example, higher prioritized safety-relevant functions of the vehicle can remain active.

Furthermore, the first control unit and additionally or alternatively the second control unit may be configured to control a second vehicle function which is independent of the first vehicle function. Advantageously, this can ensure the safety of vehicle occupants.

According to one embodiment, the first control unit may be configured to control a motion function as the first vehicle function, in particular a steering action of the vehicle. In addition or alternatively, the second control unit may be configured to control a speed-changing and/or direction-changing action as a second vehicle function, in particular a braking action and/or a steering action of the vehicle, for example by selective braking of a wheel. Advantageously, the first vehicle function and additionally or alternatively the second vehicle function is a safety-relevant function of the vehicle.

Furthermore, a method for carrying out at least one vehicle function for a vehicle using a device in one of the variants presented above is presented. The method includes a detection step and a control step. In the detection step, a failure and/or a defect of the first electrical system or the second electrical system, the first and/or second main unit, the first and/or second redundant unit is detected. In the control step, the second main unit and the first redundant unit are controlled if the first electrical system has failed and in addition or alternatively the first main unit and the second redundant unit is controlled in the control step if the second electrical system has failed in order to carry out the first vehicle function and additionally or alternatively the second vehicle function.

The method can be carried out in a vehicle which is configured, for example, to transport people and additionally or alternatively objects. The vehicle function may, for example, be a safety-relevant function of the vehicle. If, for example, the first electrical system fails, the second main unit and the first redundant unit can be controlled. Conversely, the first main unit and the second redundant unit can be controlled if the second electrical system fails. Advantageously, the first vehicle function and additionally or alternatively the second vehicle function can still be carried out in this way.

This method may be implemented, for example, in software or hardware or in a mixed form of software and hardware, for example in a control unit.

The approach presented here also creates a control unit which is configured to carry out, control or implement the steps of a variant of a method presented here in appropriate devices. Also the underlying object of the approach can be achieved quickly and efficiently by this variant of the approach in the form of a control unit.

For this purpose, the control unit may have at least one computing unit for processing signals or data, at least one memory unit for storing signals or data, at least one interface to a sensor or an actuator for reading sensor signals from the sensor or for outputting data or control signals to the actuator and/or at least one communication interface for reading or outputting data embedded in a communication protocol. The computing unit may be, for example, a signal processor, a microcontroller or the like, wherein the memory unit may be a flash memory, an EPROM or a magnetic memory unit. The communication interface may be configured to read or output data wirelessly and/or wired, wherein a communication interface which can read in or output wired data, for example, can read these data electrically or optically from a corresponding data transmission line or output the data into a corresponding data transmission line.

A control unit can be understood in the present case to be an electrical device which processes sensor signals and, depending thereon, outputs control and/or data signals. The control unit may have an interface which may be of a hardware and/or software form. In a hardware form, the interfaces can, for example, be part of a so-called system ASIC, which includes various functions of the device. However, it is also possible that the interfaces are separate, integrated circuits or at least partly consist of discrete components. In the case of a software form, the interfaces may be software modules which are arranged, for example, on a microcontroller in addition to other software modules.

In an advantageous embodiment, the control unit controls a method for carrying out at least one vehicle function for a vehicle. For this purpose, the control unit can, for example, access sensor signals such as a read-in signal, which represents a failure of an electrical system, and an output signal, which represents control of the first main unit and the second redundant unit, or control of the second main unit and the first redundant unit. The control is carried out via actuators such as the steering actuator or the brake actuator, which are configured to control the safety-relevant driving function or the comfort function, for example.

Exemplary embodiments of the approach presented here are explained in more detail in the following description with reference to the figures.

In the following description of favorable exemplary embodiments of the present approach, the same or similar reference characters are used for the elements depicted in the various figures and with a similar effect, wherein a repeated description of these elements is dispensed with.

DETAILED DESCRIPTION

Figure 1:
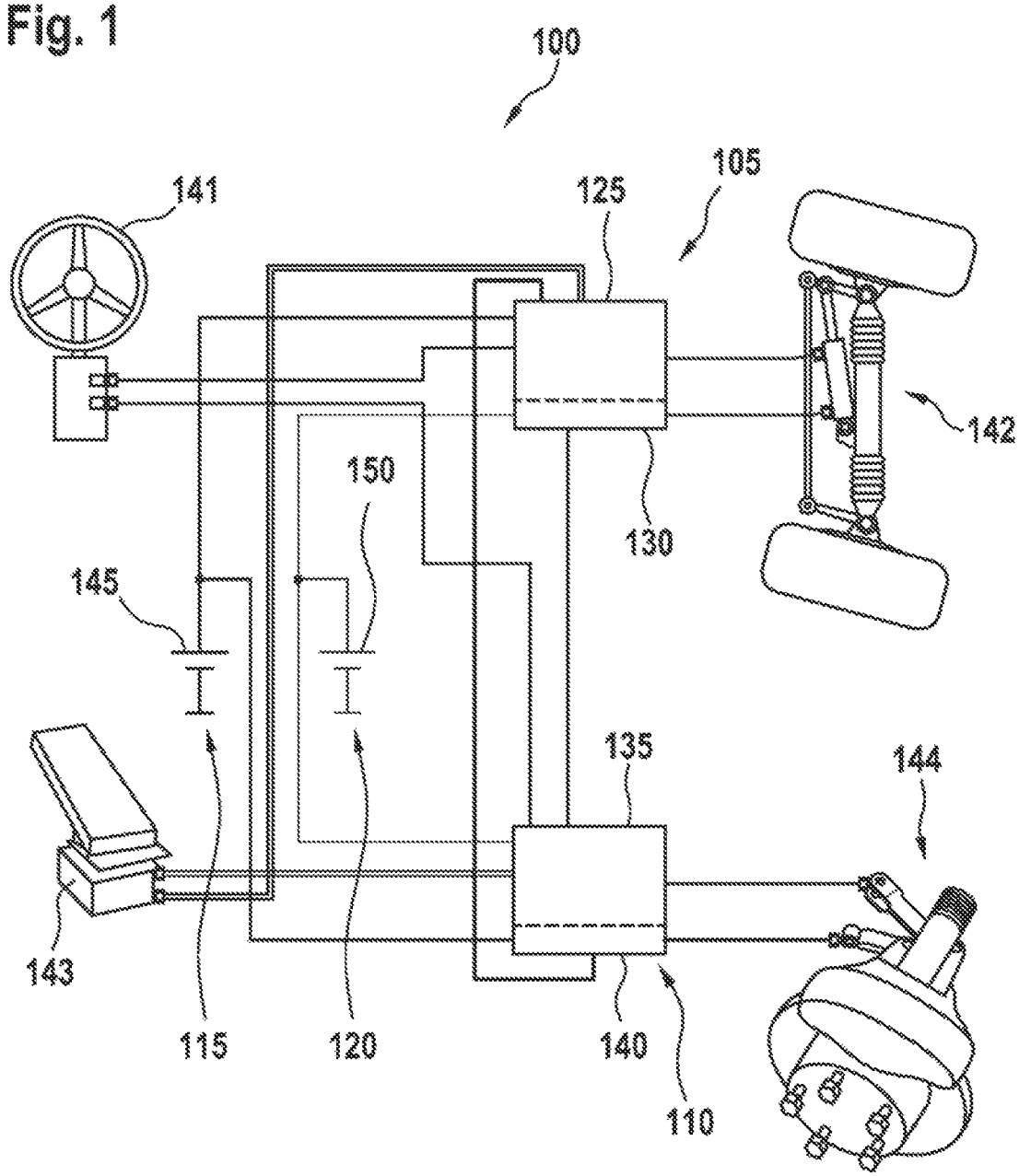
FIG. 1 shows a schematic representation of a device for carrying out at least one vehicle function for a vehicle according to an exemplary embodiment.

FIG. 1 shows a schematic representation of a device 100 for carrying out at least one vehicle function for a vehicle according to an exemplary embodiment. According to this exemplary embodiment, the device 100 has in addition to a first control unit 105 and a second control unit 110, each of which are configured to control vehicle functions, a first electrical system 115 and a second electrical system 120. The first control unit 105 in turn has a first main unit 125 and a first redundant unit 130, which are configured to control a first vehicle function. Analogously, the second control unit 110 has a second main unit 135 and a second redundant unit 140, which are configured to control a second vehicle function. According to this exemplary embodiment, the first vehicle function is a steering function of the vehicle, which is initiated, for example, by a driver by means of a steering wheel 141, so that the first control unit 105, for example, controls a steering actuator such as a servo motor as an actuator for adjustment of the path of a wheel axle 142. The second vehicle function may, for example, be a braking function initiated by the driver by operating a pedal 143, so that the second control unit 110, for example, controls a braking device 144 as an actuator.

Since the first main unit 125 and the first redundant unit 130 are arranged in the first control unit 105, they are galvanically isolated from each other according to this exemplary embodiment, for example to avoid interference. Also the second main unit 135 and the second redundant unit 140 are galvanically isolated from each other according to this exemplary embodiment for the same reason. According to this exemplary embodiment, the first electrical system 115 is configured to supply the first main unit 125 of the first control unit 105 and the second redundant unit 140 of the second control unit 110, and also to supply them with energy according to this exemplary embodiment. This means that the first electrical system 115 accordingly has a first energy source 145. According to this exemplary embodiment, the second electrical system 120 is separated from the first electrical system 115 and connects the second main unit 135 of the second control unit 110 to the first redundant unit 130 of the first control unit 105, so that they form two separate circuits. Furthermore, the second electrical system 120 has a second energy source 150, which is configured to supply the second main unit 135 and the first redundant unit 130 with energy. In other words, this means that for sufficient independence of the two subsystems of the vehicle functions, the primary subsystem, i.e. the first main unit 125 or the second main unit 135, and the redundant subsystem, i.e. the first redundant unit 130 and the second redundant unit 140, are each supplied by one of the electrical systems 115, 120 and are galvanically isolated from each other. Consequently, the electrical systems 115, 120 according to this exemplary embodiment are independent of each other but may have a common ground pole. In this exemplary embodiment, the electrical systems 115, 120 are independent since a galvanic isolation is assumed. It makes sense that this galvanic isolation takes place not only in the two control units but also at system level, so that the energy sources have no electrical connection to each other. As modifications, exemplary embodiments with a common ground or only one battery are conceivable. In this case, however, strict galvanic isolation should no longer be referred to.

In other words, a concept for an efficient system for fault-tolerant lateral and longitudinal guidance of highly automated vehicles will be presented. To achieve this, the other control unit, i.e. the first control unit 105 for the second control unit 110 and the second control unit 110 for the first control unit 105, represents a fallback plane of the one control unit. Accordingly, each of the two control units 105, 110 is assigned a main function and a backup function. In order to enable a backup functionality by means of a redundant unit 130, 140, further circuit components are provided in the first control unit 105 and in the second control unit 110, such as additional power amplifiers, which are arranged for the respective redundant unit 130, 140 according to this exemplary embodiment. The corresponding circuit components can, for example, provide voltage conditioning, can be in the form of a microcontroller or CAN (Controller Area Network) and can be integrated only once per control unit 105, 110. According to this exemplary embodiment, the redundant units 130, 140 are therefore configured to act as a backup. According to an optional exemplary embodiment, a comfort function of the vehicle, such as seat heating, or pad wear control as an example of a comfort function of a brake control unit, is deactivated in order to be able to continue to perform a safety-relevant vehicle function in the event of a failure, for example of one of the control units 105, 110. Optionally, for example, the output stages of the redundant subsystem of the steering, or the first redundant unit 130, can also be accommodated in the second control unit 135, which controls a braking function, for example. In order to avoid EMC load (EMC=electromagnetic compatibility) caused by high currents or weight-related suboptimal configuration of a wiring harness, according to this exemplary embodiment current-bearing cables are arranged within a maximum distance from the energy sources 115, 120 and/or a corresponding actuator and the respective control unit 105, 110.

Figure 2:
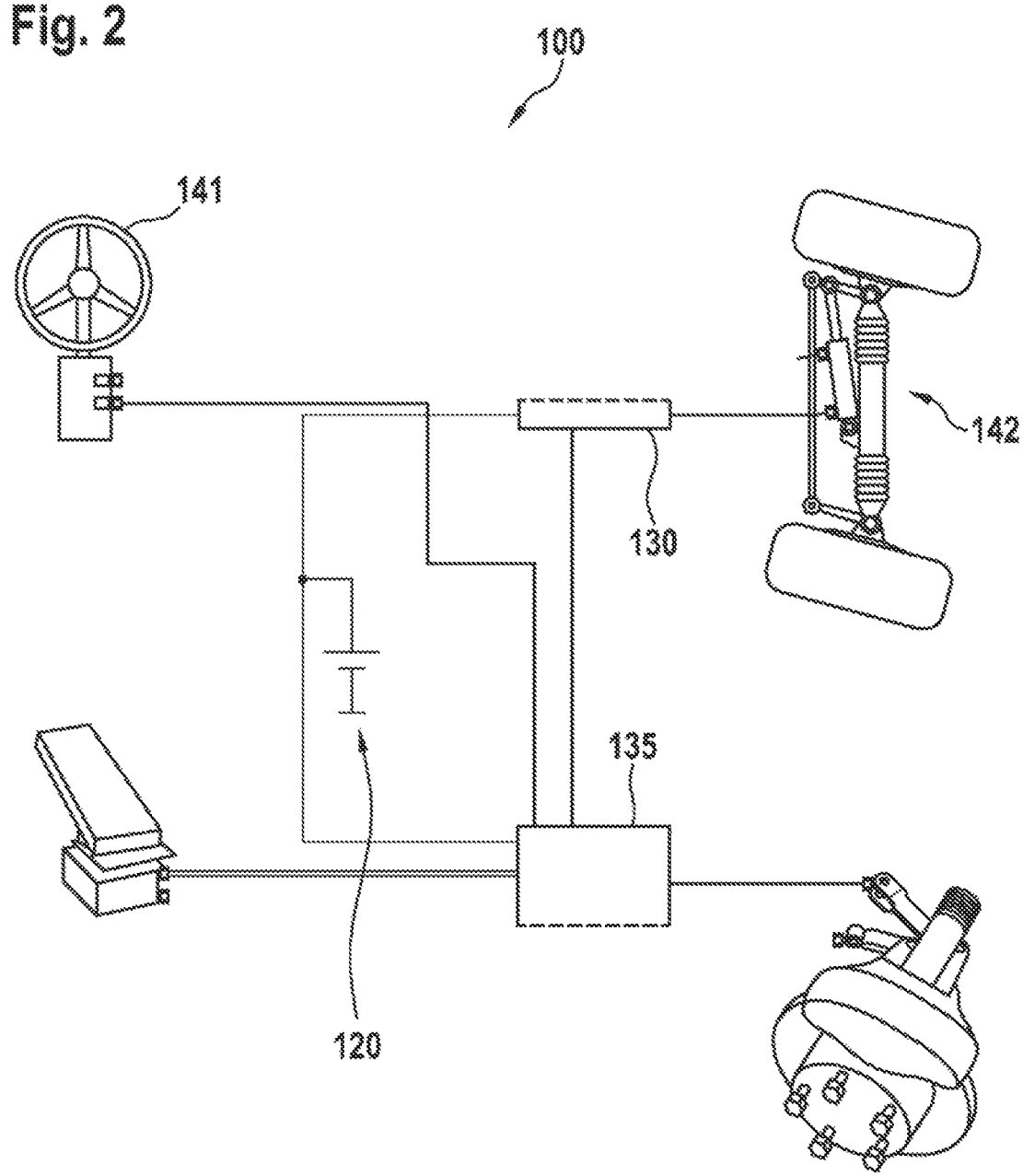
FIG. 2 shows a schematic representation of a device after failure of a first electrical system and additionally or alternatively of the first control unit of a vehicle according to an exemplary embodiment.

FIG. 2 shows a schematic representation of a device 100 after failure of a first electrical system and additionally or alternatively the first control unit of a vehicle according to an exemplary embodiment. It can be noted in this context that a failure of an electrical system or a control unit can be understood in the present case both as a failure of a hardware component and a failure/crash of a software component of the control software of a relevant unit. This may be an exemplary embodiment of the device described on the basis of FIG. 1. To illustrate the approach presented in FIG. 1 and to illustrate a failure situation in which the first electrical system has failed, the device 100 is only illustrated with the second electrical system 120, which is also connected to the second main unit 135 and the first redundant unit 130 according to this exemplary embodiment. According to this exemplary embodiment, in addition to the second vehicle function, the first vehicle function can nevertheless be controlled, since the second main unit 130 is connected to the steering wheel 141 and the first redundant unit 130. The first redundant unit 130 is still connected to the actuator for adjusting the path of the wheel axle 142, so that the second main unit 135 continues to control the first vehicle function and the safety of the driver or other vehicle occupants can be ensured.

In other words, according to this exemplary embodiment, the first electrical system has failed, a microcontroller has failed, or any other critical fault has occurred in the first control unit, so that the second control unit or the second main unit 135 is controlling the first redundant unit 130 and thus the first vehicle function. In short, FIG. 2 shows fault-tolerant steering functionality in the event of the first electrical system being unavailable or of failure of the microcontroller in the first control unit, which is also referred to as the steering control unit.

Figure 3:
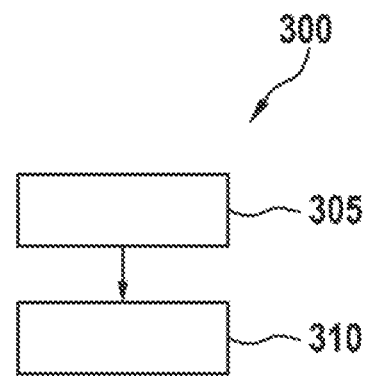
FIG. 3 shows a flowchart of a method for carrying out at least one vehicle function for a vehicle according to an exemplary embodiment.

FIG. 3 shows a flowchart of a method 300 for carrying out at least one vehicle function for a vehicle according to an exemplary embodiment. In this case, the method 300 according to this exemplary embodiment can be carried out by a device for a vehicle described on the basis of FIG. 1. According to this exemplary embodiment, the method 300 comprises a detection step 305 and a control step 310. In the detection step 305, a failure of the first electrical system or the second electrical system is detected. In the control step 310, the second main unit and the first redundant unit are controlled if the first electrical system has failed. Furthermore, in addition or alternatively in the control step 310 the first main unit and the second redundant unit are controlled if the second electrical system has failed. As a result, the first vehicle function and/or the second vehicle function is/are carried out.

Figure 4:
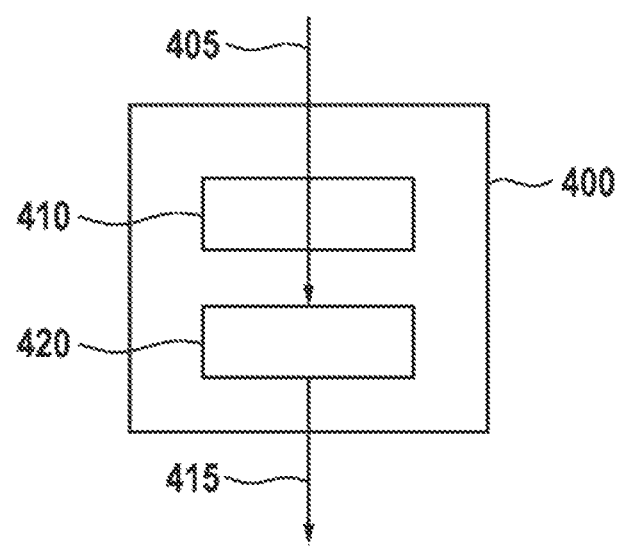
FIG. 4 shows a block diagram of a control unit for controlling a method for carrying out at least one vehicle function for a vehicle according to an exemplary embodiment.

FIG. 4 shows a block diagram of a control unit 400 for controlling a method for carrying out at least one vehicle function for a vehicle according to an exemplary embodiment. This may be a control unit 400 which is configured to control the method described in FIG. 3. According to this exemplary embodiment, for example, a detection signal 405, which represents the detected failure, is read in by a read-in unit 410. Subsequently, according to this exemplary embodiment, a control signal 415, which represents a control command of the vehicle functions, is output by an output unit 420 using the detection signal 405.

The method steps presented here can be carried out repeatedly and in a different order than in the described order.

If an exemplary embodiment contains an "and/or" link between a first feature and a second feature, this is to be read in such a way that the exemplary embodiment according to one embodiment has both the first feature and the second feature and according to a further embodiment has either only the first feature or only the second feature.

THE REFERENCE CHARACTER LIST IS AS FOLLOWS

100 Device
105 First control unit
110 Second control unit
115 First electrical system
120 Second electrical system
125 First main unit
130 First redundant unit
135 Second main unit
140 Second redundant unit
141 Steering wheel
142 Wheel axle
143 Pedal
144 Brake device
145 First energy source
150 Second energy source
300 Method
305 Detection step
310 Control step
400 Control unit
405 Detection signal
410 Read-in unit
415 Control signal
420 Output unit

The invention claimed is:

1. A device for carrying out at least one vehicle function for a vehicle, comprising:
    a first control unit having a first main unit and a first redundant unit, which are configured to control a first vehicle function;
    a second control unit having a second main unit and a second redundant unit, which are configured to control a second vehicle function; and
    a first electrical system to connect the first main unit to the second redundant unit, and a second electrical system, which is separated from the first electrical system, is configured to connect the second main unit to the first redundant unit, wherein the second main unit is configured to control the first redundant unit when the first electrical system fails, and wherein the first main unit is configured to control the second redundant unit when the second electrical system fails;
    wherein the first main unit and the first redundant unit are arranged in the first control unit and are galvanically isolated from each other, and wherein the second main unit and the second redundant unit are arranged in the second control unit and are galvanically isolated from each other.

2. The device of claim 1, wherein the first electrical system has a first energy source and wherein the second electrical system has a second energy source, wherein the first energy source and/or a first actuator for carrying out the first vehicle function is arranged within a first maximum distance of the first main unit and the first redundant unit, and wherein the second energy source and/or a second actuator for carrying out the second vehicle function is arranged within a second maximum distance of the second main unit and the second redundant unit.

3. The device of claim 1, wherein the first electrical system is configured to feed the first main unit and the second redundant unit with energy, and wherein the second electrical system is configured to feed the second main unit and the first redundant unit with energy.

4. The device of claim 1, wherein the first control unit and/or the second control unit are configured to deactivate at least one comfort function of the vehicle when the first vehicle function and/or the second vehicle function fails.

5. The device of claim 1, wherein the first control unit and/or the second control unit is configured to control a second vehicle function which is independent of the first vehicle function.

6. The device of claim 1, wherein the first control unit is configured to control a motion function as the first vehicle function, including a steering action of the vehicle, and/or wherein the second control unit is configured to control a speed-changing and/or direction-changing action as a second vehicle function, including a braking action of the vehicle.

7. A method for carrying out at least one vehicle function for a vehicle using a device, the method comprising:
    detecting a failure and/or defect of a first electrical system or a second electrical system, wherein the device includes:
        a first control unit having a first main unit and a first redundant unit, which are configured to control a first vehicle function; and
        a second control unit having a second main unit and a second redundant unit, which are configured to control a second vehicle function;
        wherein the first electrical system is configured to connect the first main unit to the second redundant unit, and the second electrical system, which is separated from the first electrical system, is configured to connect the second main unit to the first redundant unit, wherein the second main unit is configured to control the first redundant unit when the first electrical system fails, and wherein the first main unit is configured to control the second redundant unit when the second electrical system fails;

wherein the first main unit and the first redundant unit are arranged in the first control unit and are galvanically isolated from each other, and wherein the second main unit and the second redundant unit are arranged in the second control unit and are galvanically isolated from each other; and controlling the second main unit and the first redundant unit when the first electrical system has failed and controlling the first main unit and the second redundant unit when the second electrical system has failed to perform the first vehicle function and/or the second vehicle function.

8. A control apparatus for carrying out at least one vehicle function for a vehicle using a device, comprising:

a control unit configured to perform the following:
  detecting a failure and/or defect of a first electrical system or a second electrical system, wherein the device includes:
    a first control unit having a first main unit and a first redundant unit, which are configured to control a first vehicle function; and
    a second control unit having a second main unit and a second redundant unit, which are configured to control a second vehicle function;
  wherein the first electrical system is configured to connect the first main unit to the second redundant unit, and the second electrical system, which is separated from the first electrical system, is configured to connect the second main unit to the first redundant unit, wherein the second main unit is configured to control the first redundant unit when the first electrical system fails, and wherein the first main unit is configured to control the second redundant unit when the second electrical system fails;
  wherein the first main unit and the first redundant unit are arranged in the first control unit and are galvanically isolated from each other, and wherein the second main unit and the second redundant unit are arranged in the second control unit and are galvanically isolated from each other; and
  controlling the second main unit and the first redundant unit when the first electrical system has failed and/or controlling the first main unit and the second redundant unit when the second electrical system has failed to perform the first vehicle function and/or the second vehicle function.

9. A non-transitory computer readable medium having a computer program, which is executable by a processor, comprising:

a program code arrangement having program code carrying out at least one vehicle function for a vehicle using a device, by performing the following:
  detecting a failure and/or defect of a first electrical system or a second electrical system, wherein the device includes:
    a first control unit having a first main unit and a first redundant unit, which are configured to control a first vehicle function; and
    a second control unit having a second main unit and a second redundant unit, which are configured to control a second vehicle function;
  wherein the first electrical system is configured to connect the first main unit to the second redundant unit, and the second electrical system, which is separated from the first electrical system, is configured to connect the second main unit to the first redundant unit, wherein the second main unit is configured to control the first redundant unit when the first electrical system fails, and wherein the first main unit is configured to control the second redundant unit when the second electrical system fails;
  wherein the first main unit and the first redundant unit are arranged in the first control unit and are galvanically isolated from each other, and wherein the second main unit and the second redundant unit are arranged in the second control unit and are galvanically isolated from each other; and
  controlling the second main unit and the first redundant unit when the first electrical system has failed and/or controlling the first main unit and the second redundant unit when the second electrical system has failed to perform the first vehicle function and/or the second vehicle function.

* * * * *